US00RE47184E

(19) United States
(12) Reissued Patent
Zwayer et al.

(10) Patent Number: US RE47,184 E
(45) Date of Reissued Patent: Jan. 1, 2019

(54) FISHING REEL WITH IMPROVED LINE MANAGEMENT AND CONTROL SYSTEM AND CLICKER MECHANISM

(71) Applicant: W.C. BRADLEY/ZEBCO HOLDINGS, INC., Tulsa, OK (US)

(72) Inventors: Kent L. Zwayer, Tulsa, OK (US); M. Scott Smith, Broken Arrow, OK (US)

(73) Assignee: W.C. BRADLEY/ZEBCO HOLDINGS, INC., Tulsa, OK (US)

(21) Appl. No.: 15/250,592

(22) Filed: Aug. 29, 2016

Related U.S. Patent Documents

Reissue of:
(64) Patent No.: 9,210,920
Issued: Dec. 15, 2015
Appl. No.: 13/935,253
Filed: Jul. 3, 2013

(51) Int. Cl.
*A01K 89/02* (2006.01)
*A01K 89/01* (2006.01)

(52) U.S. Cl.
CPC ..... *A01K 89/0108* (2013.01); *A01K 89/02* (2013.01)

(58) Field of Classification Search
CPC ..... A01K 89/0108; A01K 89/01029; A01K 89/0275
See application file for complete search history.

(56) References Cited

U.S. PATENT DOCUMENTS 3,481,554 A * 12/1969 Hull ..... 242/240
3,836,092 A * 9/1974 Hull ..... 242/238
4,156,510 A * 5/1979 Hull ..... 242/240
4,386,743 A * 6/1983 Moss ..... 242/240
4,496,115 A 1/1985 Kreft et al.
4,509,705 A 4/1985 Councilman et al.
4,523,726 A * 6/1985 Swisher ..... 242/300
4,629,141 A 12/1986 Darden
4,637,569 A * 1/1987 Swisher ..... 242/239
4,735,376 A 4/1988 Hlava
4,760,974 A * 8/1988 Swisher ..... 242/240
4,768,731 A * 9/1988 Neufeld ..... 242/239
4,778,120 A * 10/1988 Finney et al. ..... 242/244
5,213,279 A 5/1993 Puryear
5,785,266 A * 7/1998 Bowersox ..... 242/323
6,089,484 A * 7/2000 Zwayer et al. ..... 242/321
6,572,043 B1 6/2003 Burke et al.
6,641,070 B1 * 11/2003 Wong ..... 242/312
(Continued)

*Primary Examiner* — Matthew C Graham
(74) *Attorney, Agent, or Firm* — James F. Lea, III; Gable Gotwals

(57) ABSTRACT

A fishing reel designed to minimize line snag and simplify clicker operation. A frame mounted spool includes a forward flange defining a circumferential groove for receiving a smooth surfaced ring that is loosely mounted therein for minimizing line interaction. A spinner head assembly has pin arms that are pivotally secured to a rearward face. The pin arms present a substantially smooth rear surface for minimizing line snags. Pin springs are mounted on the opposite face of spinner head member and communicate with the pin arms via pin arm posts that extend through openings. An enclosure is affixed to the forward face of the spinner head for permitting the pin springs to have freedom of movement, but for enclosing pin springs and posts to prevent interaction with fishing line. A dual clicker passes through the frame for engaging the spool and the drag adjusting wheel.

19 Claims, 5 Drawing Sheets

(56) References Cited

U.S. PATENT DOCUMENTS

| | | | | |
|---|---|---|---|---|
| 9,363,987 | B2 | 6/2016 | Hiraoka | |
| 2002/0027176 | A1* | 3/2002 | Ikuta | 242/247 |
| 2016/0073619 | A1 | 3/2016 | Ochiai et al. | |
| 2016/0150769 | A1 | 6/2016 | Hiraoka et al. | |

* cited by examiner

FISHING REEL WITH IMPROVED LINE MANAGEMENT AND CONTROL SYSTEM AND CLICKER MECHANISM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF THE INVENTION

The invention relates to a line management and control system for a fishing reel. More particularly, but not by way of limitation, the invention relates to improved structure for preventing line fouling during operation of a spincast reel as well as an improved clicker mechanism.

BACKGROUND OF THE INVENTION

Spincast reels are well known in the art. A spincast reel typically includes a central body including a frame, a front cover positionable over at least the front face of the frame and having a tapered forward wall, a back cover positionable over at least the back face of the frame, a casting button projecting from the back cover, and a crank handle extending from a side of the fishing reel. Most of the operating structures and operating mechanisms of the reel are either mounted on, formed on, or mounted through the frame. As discussed below, the crank handle is operable for winding a fishing line around a spool contained within the reel. The spool is typically mounted on a spool hub that projects forwardly from the front of the frame.

A spincast reel will also include a foot structure for securing the reel on a fishing rod. The foot structure typically extends from either the bottom of the body or from the bottom of the back cover.

Operating structures and mechanisms contained in a typical spincast reel include an elongate main or center shaft that slidably and rotatably extends through the frame and through the spool, a spinner head secured to the forward end of the main or center shaft, a pinion gear positioned on the main shaft, a crankshaft extending from the crank handle into the side of the reel and through a crankshaft boss provided on the rearward face of the frame, a drive gear or face gear secured on the crankshaft, an anti-reverse mechanism, such as a ratchet/pawl-type mechanism, in communication with the crankshaft for preventing reverse rotation of the crank handle and crankshaft, and an adjustable drag system.

A pinion gear is typically retained in the reel adjacent the rear face of the frame. The pinion gear is keyed on the main or center shaft for imparting rotational movement to the center shaft while allowing the shaft to slide longitudinally through the frame. The crankshaft drive gear operably engages the pinion gear such that rotational movement is imparted to the main shaft by turning the crank handle.

When an excessive pulling force is applied to the fishing line, the drag system counteracts the anti-reverse mechanism of the reel to payout a sufficient amount of additional fishing line to prevent the line from breaking. Most drag systems function to allow either an adjustable resistance to rotational slippage of the line spool about the spool hub or to allow an adjustable resistance to rotational slippage of the drive gear about the crankshaft. A typical drag system will also include an external adjustment mechanism, such as either a finger-operated drag wheel projecting from the reel housing or a star-shaped dial operably secured adjacent the crank handle on the exterior end of the crankshaft.

The spinner head attached to the forward end of the main shaft winds fishing line on the reel spool. While winding, the spinner head is positioned over the spool. When the user turns the crank handle, the rotational movement of the handle is mechanically transferred to the spinner head by means of the drive or face gear, the pinion gear, and the center shaft. The spinner head typically includes a mechanism for holding and positioning the fishing line so that, as the spinner head rotates, the spinner head wraps line around the spool. The mechanism is typically a set of line-grasping notches formed in a rearward edge of the spinner head or a spring-loaded pickup pin or pins that project laterally through a sidewall of the spinner head.

A spincast reel will also typically include a biasing member for biasing the main or center shaft rearwardly toward engagement with the casting button. The biasing member commonly consists of a spring positioned around the rearward portion of the center shaft. The spring is typically attached to or retained by the rearward end of the main shaft such that the spring also holds the pinion or center shaft gear against the reel frame.

When casting a spincast reel, a user initially presses and holds the thumb button whereby the main shaft and the spinner head move forward and the spinner head clamps the fishing line against the tapered forward wall of the front cover. The line is thus prevented from moving outward, i.e., is prevented from paying out during the power portion of the casting motion. The forward movement of the center shaft and spinner head also typically activates a locking mechanism that limits the rearward movement of the spinner head such that the spinner head is prevented from returning to its winding position and disengages the line-grasping mechanism.

At the end of the casting motion, the user releases the thumb button to allow the shaft spring to move the center shaft and the spinner head rearwardly such that the fishing line is no longer clamped against the tapered forward wall of the front cover. With the line released and the spinner head prevented from grasping or otherwise engaging the fishing line, the line flows freely over the forward end of the line spool and through a line opening provided in the forward end of the front cover.

After casting, the user returns the spinner head and the line-grasping mechanism to their winding positions by turning the crank handle. One or more cam lobes or other release mechanisms are typically provided on the frame or elsewhere in the reel for releasing the spinner head locking mechanism in response to rotational movement of the spinner head.

SUMMARY OF THE INVENTION

A fishing reel of the present invention has a body that includes a frame having front side and a rear side. The frame defines an axial orifice that communicates the front side and the rear side of the frame. A main shaft is slidably received in the axial orifice.

A spool is rotatably mounted on the frame. The spool defines a forward flange, a rearward flange and a line receiving area between the forward flange and the rearward flange. The forward flange of the spool defines a circumferential groove. A ring having a T-shaped cross-section is received in the circumferential groove of the forward flange of the spool. The ring has a smooth outer surface and is loosely mounted in the circumferential groove, i.e., the ring is "free-floating", which allows for limited radial displacement of a section of the ring. The features of the T-ring are designed to minimize interference with fishing line during operation of the reel.

A spinner head assembly is secured to the main shaft forward of the frame and the spool. The spinner head assembly is made up of a plate member having a forward face and a rearward face. The spinner head assembly additionally includes a circumferential wall that extends rearwardly from the plate member. A first and second pin arm are pivotally secured to the rearward face of the plate member. The first and second pin arms present a substantially smooth rear surface for minimizing line snags.

The first and second pin arms each have a pin for selectively extending through a pin opening in the circumferential wall of the spinner head assembly. First and second pin springs are mounted on the forward face of the plate member of the spinner head assembly for biasing the first and second pin arms to a retracted position. The first and second pin arms each define a post that extends through a spring post opening in the plate member of the spinner head assembly for engaging a respective one of the first and second pin springs.

An enclosure member is affixed to the forward face of the plate member of the spinner head assembly. The enclosure member permits the first and second pin springs to have freedom of movement, but enclose the first and second pin springs and the posts to prevent interaction with fishing line.

A drag adjusting wheel is mounted in the body and is accessible from an exterior of the body for selective rotation. A forward face of the drag adjusting wheel defines an irregular surface. Additionally, a rearward face of the spool defines an irregular surface. The irregular surfaces of the drag adjusting wheel and the spool are preferably comprised of a plurality of detents.

A dual clicker assembly passes through the frame for engaging the spool and the drag adjusting wheel. The dual clicker provides tactile and audible feedback regarding movement of either of the spool and the drag adjusting wheel. The dual clicker has a rearward end that engages the irregular surface of the drag adjusting wheel and has a forward end that engages the irregular surface of the spool.

The dual clicker preferably comprises a member and a cap mounted on the member. A spring is provided for biasing the member and the cap apart so that one of the member and the cap define a rearward end of the dual clicker assembly for engaging a forward face of the drag adjusting wheel and the other one of the member and the cap define a forward end of the dual clicker for engaging a rearward face of the spool.

DETAILED DESCRIPTION OF THE PREFERRED EMBODIMENTS

Figure 4:
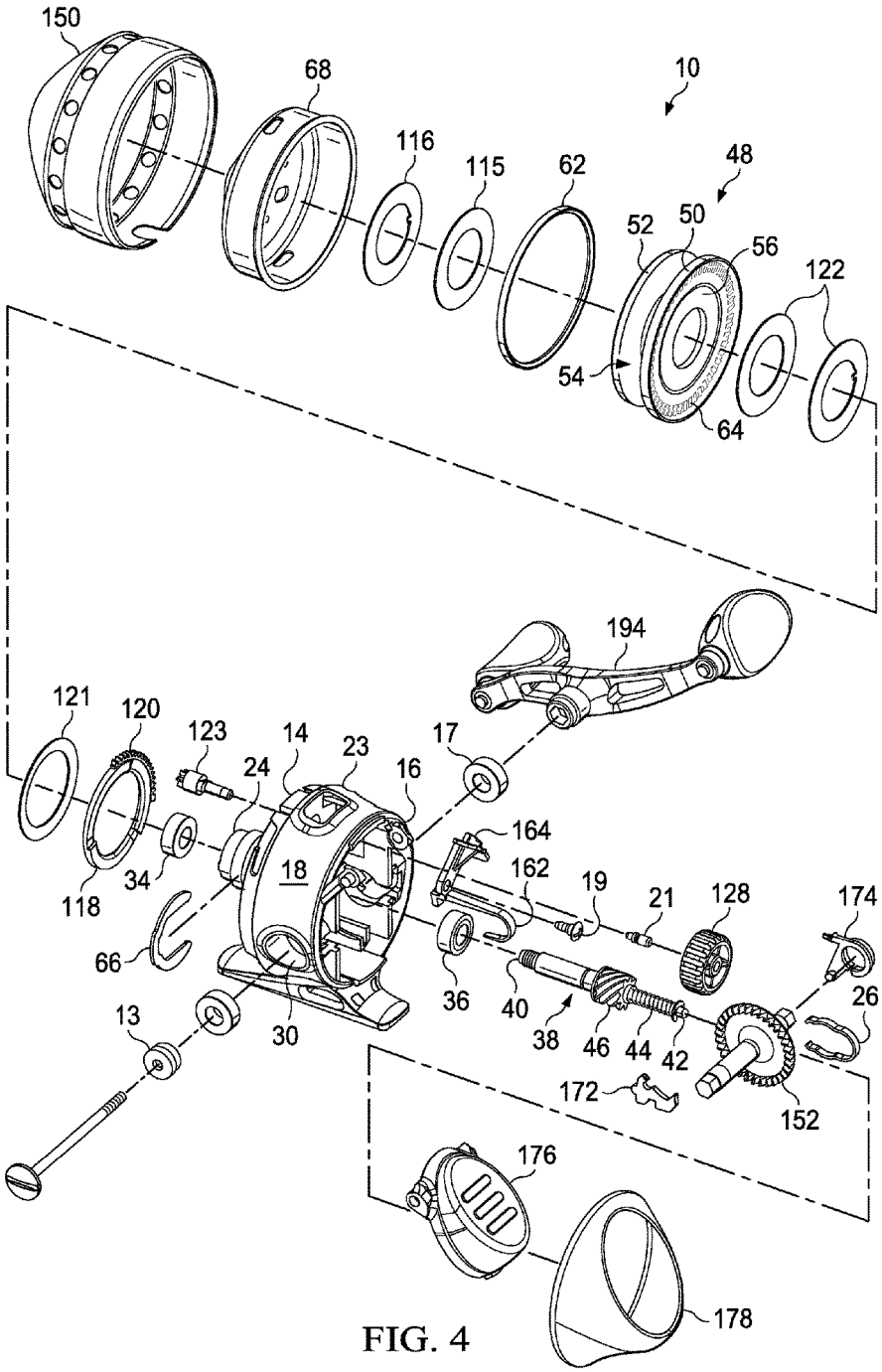
FIG. 4 is an exploded view of the reel of FIG. 1.

Referring first to FIGS. 1-5, shown is a fishing reel 10. Fishing reel 10 has a body 12 having a front edge 14 and a rear edge 16. Body 12 includes frame 18. Frame 18 has a front side 20 and a rear side 22. Additionally, frame 18 defines thumb button attachment structure 23 (FIG. 4). Frame 18 has a stem 24 protruding forwardly from front side 20 of frame 18. Frame 18 defines axial orifice 26 that communicates front side 20 and rear side 22 and passes through stem 24. Frame 18 additionally defines clicker orifice 28 and drag cam pinion orifice 29. Additionally, to facilitate handle attachment, frame 18 defines first side orifice 30 and second side orifice 32.

Bushing 34 is received within axial orifice 26 and stem 24. Ball bearing 36 is also received within axial orifice 26. Main shaft 38 is slidably received in axial orifice 26 of body 12 and is supported by ball bearings 36 and busing 34. Main shaft 38 has a threaded front end 40 and a rearward end 42. Main shaft 38 is biased rearwardly by main shaft spring 44. Main shaft pinion gear 46 is slidably keyed to main shaft 38.

Spool 48 is rotatably mounted on stem 24 of frame 18. Spool 48 has a rearward flange 50 and a forward flange 52 defining a line receiving area 54 therebetween. Spool 48 further defines a rearward face 56 and a forward face 58. Forward flange 52 defines a circumferential groove 60 that receives T-ring 62. T-ring 62 is loosely mounted, or is "free floating" in circumferential groove 60 and preferably defines a smooth, hard outer surface. Rearward face 56 of spool 48 defines an irregular surface 64 made up a plurality of detents located proximate to an outer edge of rearward flange 50. Spool retainer 66 engages stem 24 to retain spool 48 on stem 24.

Figure 1:
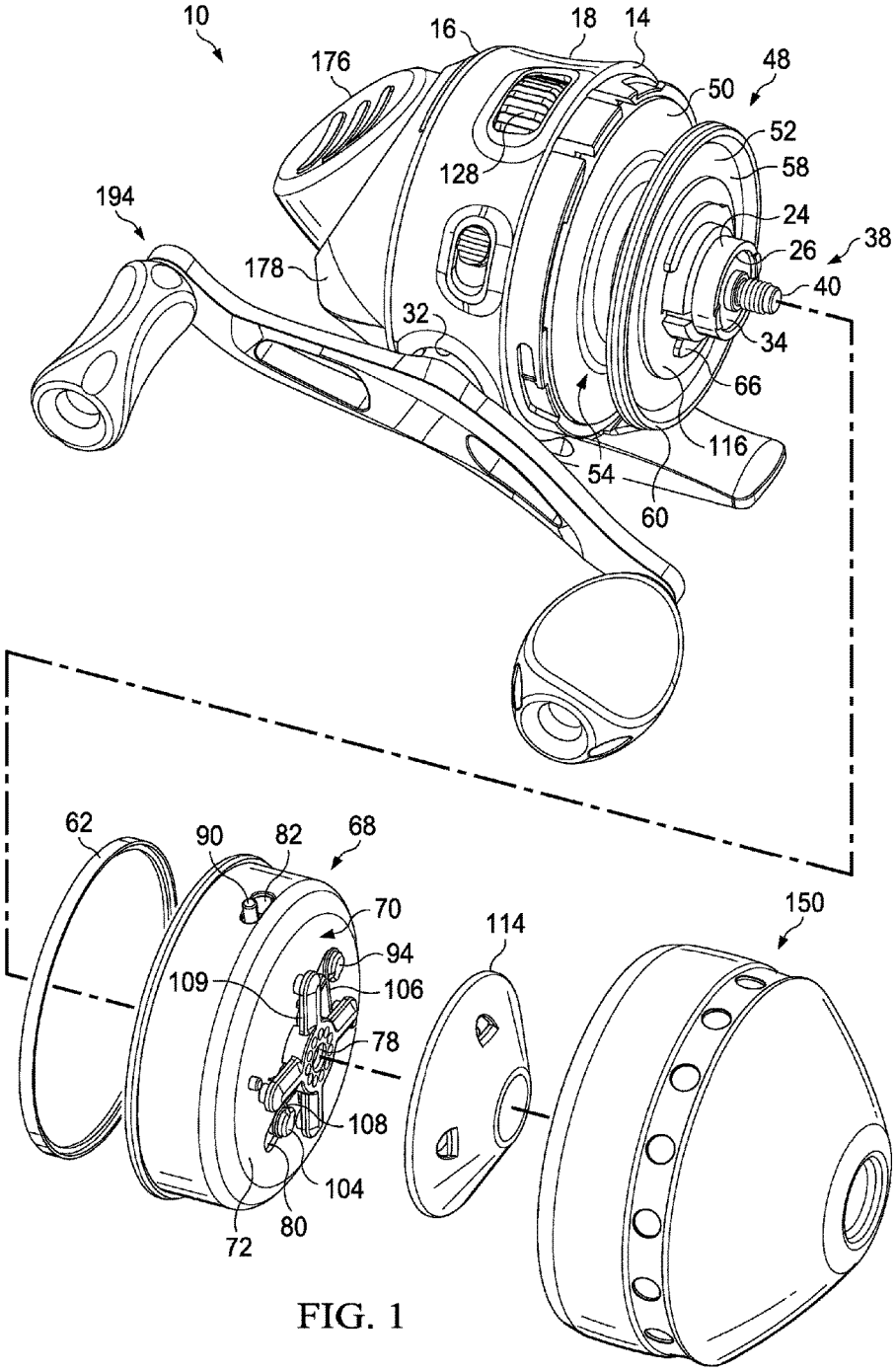
FIG. 1 is a partially exploded perspective front view of the reel of the invention.
Figure 2:
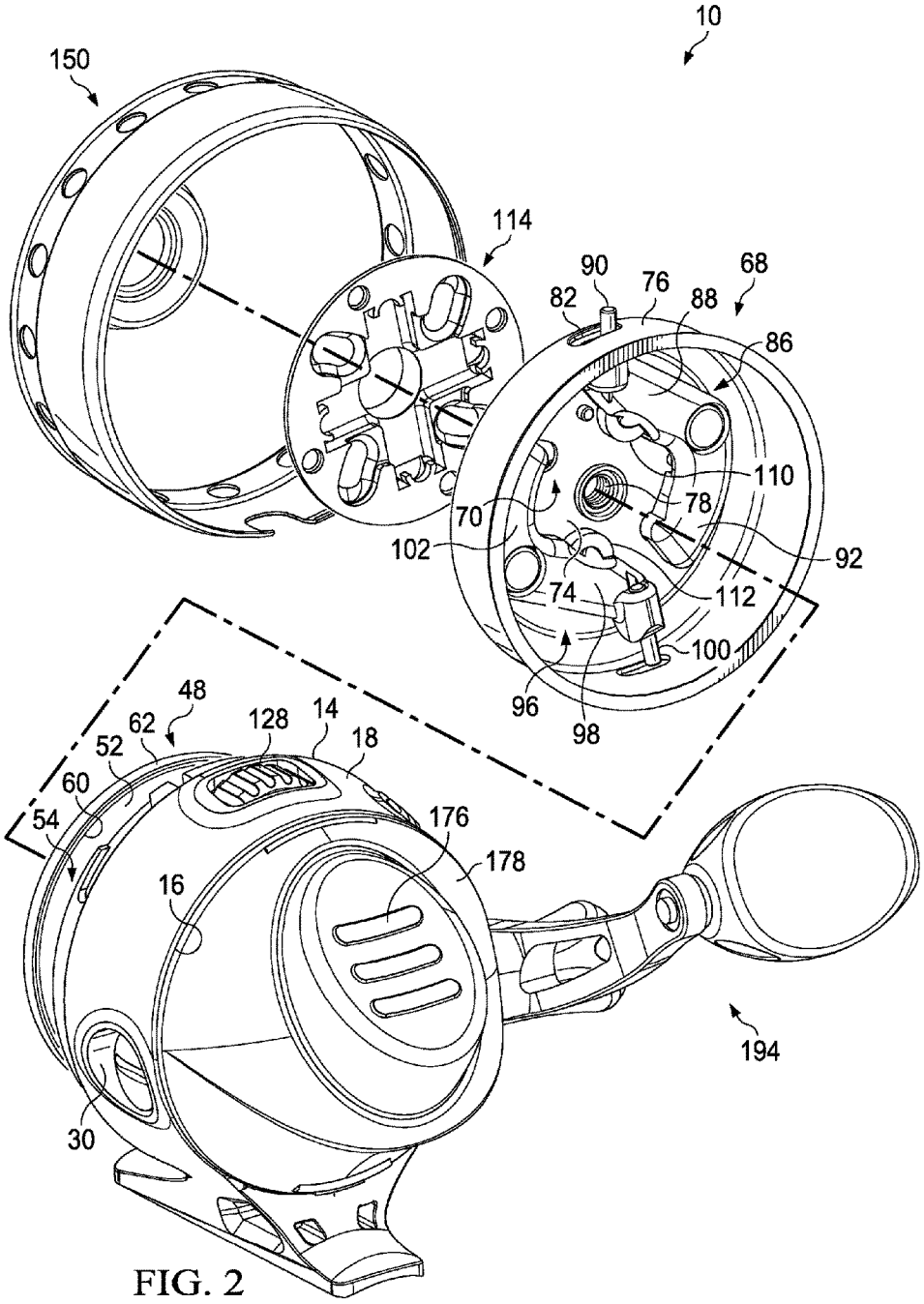
FIG. 2 is a partially exploded perspective rear view of the reel of FIG. 1.
Figure 3:
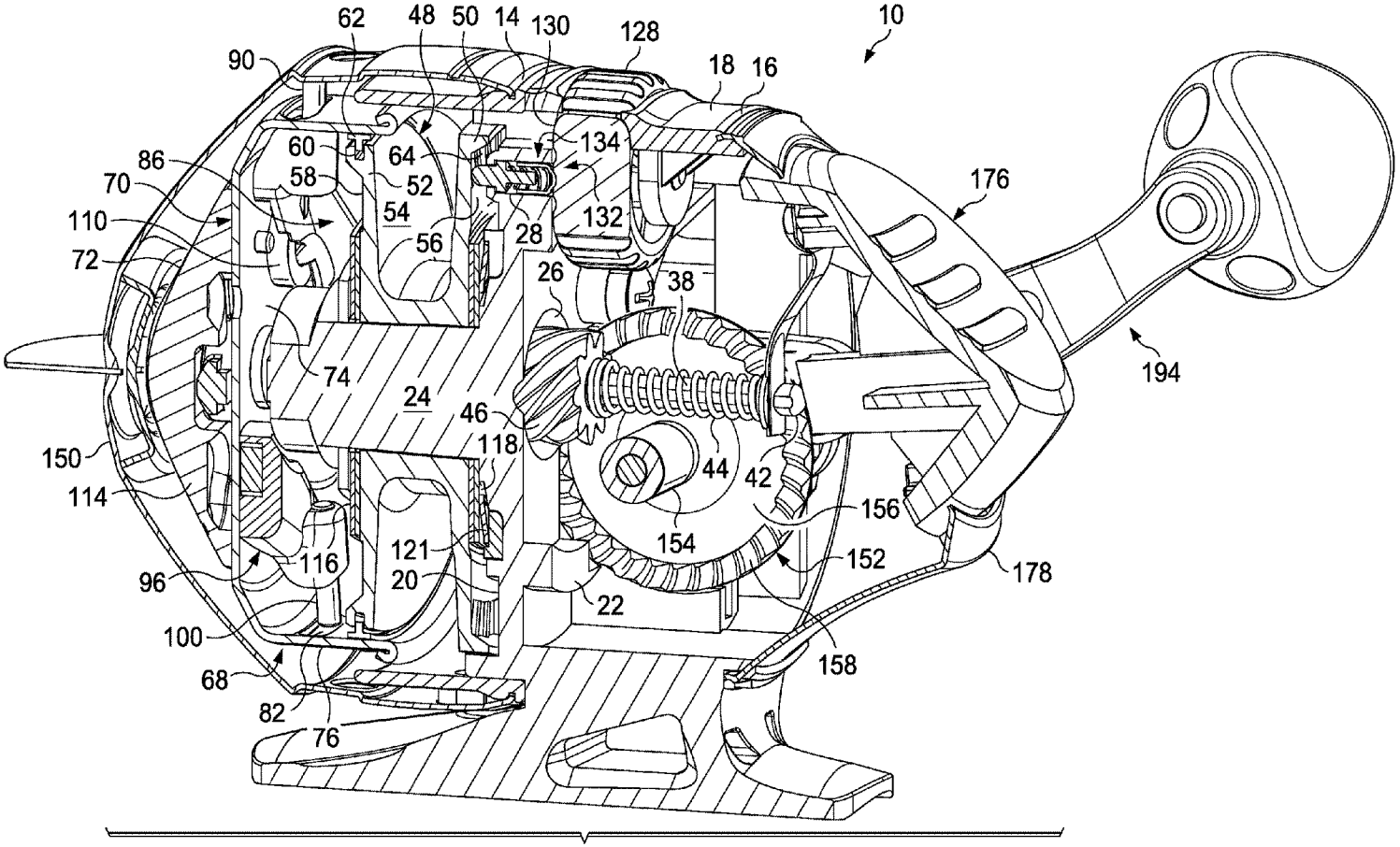
FIG. 3 is a cross-sectional perspective view of the reel of FIG. 1.

Referring now primarily to FIGS. 1 and 2, spinner head assembly 68 is secured to threaded front end 40 of main shaft 38 on front side 20 of frame 18 of body 12. Spinner head assembly 68 includes plate 70 having a forward face 72 and a rearward face 74. A circumferential wall 76 extends rearwardly from rearward face 74. Plate 70 defines threaded orifice 78 for threadably engaging threaded front end 40 of main shaft 38. Plate 70 additionally defines spring post openings 80 (FIG. 1). Circumferential wall 76 defines pin openings 82.

A first pin arm 86 is pivotally secured to rearward face 74 of plate 70 of spinner head assembly 68. First pin arm 86 has a pin portion 88 for supporting pin 90 that selectively extends through an adjacent pin opening 82. First pin arm 86 has a spring engaging portion 92 that defines a post 94 for extending through an adjacent spring post opening 80 of plate 70 (FIG. 1).

A second pin arm 96 is pivotally secured to rearward face 74 of plate 70 of spinner head assembly 68. Second pin arm 96 has a pin portion 98 for supporting pin 100 that selectively extends through an adjacent pin opening 82. Second pin arm 96 has a spring engaging portion 102 defining post 104 for extending through an adjacent spring post opening 80 of plate 70 of spinner head assembly 68 (FIG. 1). First pin arm 86 and second pin arm 96 preferably have rounded and flat surfaces that present a low risk of line snags. Flat rearward surface of first pin arm 86 and second pin arm 96 are preferably smooth and substantially co-planar with one another and with any securing mechanisms for securing pin arms 86 and 96 to rearward face 74 of spinner head assembly 68. As can be best seen in FIG. 2, first pin arm 86 and second pin arm 96 present a co-planar rearward surface with the exception of structures for supporting and aligning pins 90 and 100. Further, rotationally mounted T-ring 62, having a smooth outer surface, further reduces the potential for interaction with fishing line into an area between spool 48 and spinner head assembly 68.

A first pin spring 106 is affixed to forward face 72 of plate 70. First pin spring 106 is provided for an engaging post 94 of first pin arm 86 and for biasing first pin arm 86 to a retracted position. A second pin spring 108 is affixed to forward face 72 of plate 70. Second pin spring 108 is provided for engaging post 104 of second pin arm 96 and for biasing second pin arm 96 to a retracted position. First pin spring 106 and second pin spring 108 are secured to forward face 72 of plate 70 with cross-brace 109 (FIG. 1).

First stem engaging member 110 is provided on pin portion 88 of first pin arm 86. First stem engaging member 110 engages stem 24 for holding first pin arm 86 in an extended position during retraction of fishing line. First stem engaging member 110 is also for releasing from an end of stem 24 during casting mode of reel 10.

Second stem engaging member 112 is provided on pin portion 98 of second pin arm 96. Second stem engaging member 112 engages stem 24 and holds second pin arm 96 in an extended position during retraction of fishing line. Second stem engaging member 112 additionally releases from an end of stem 24 during casting mode of reel 10.

Conical elastomeric enclosure member 114 is affixed to forward face 72 of plate 70 of spinner head assembly 68. Conical elastomeric enclosure member 114 covers cross brace 109 and permits first pin spring 106 and second pin spring 108 to have freedom of movement but encloses first pin spring 106, second pin spring 108, first post 94, and second post 104 to prevent interaction of these components with fishing line. Therefore, it can be seen that potential line snagging structure, such as pin springs 106 and 108, are moved to the forward face 72 of spinner head assembly 68 and enclosed by enclosure member 114. Structure remaining on rearward side of spinner head 68, including pin arms 86 and 96, present a substantially smooth and co-planar surface for minimizing potential line snags.

Drag washer 115 is provided between spool 48 and spinner head assembly 68. Keyed drag washer 116 is provided between drag washer 115 and spinner head assembly 68. Drag cam plate 118 is rotatably affixed to rear side 22 of frame 18 of body 12. Drag cam plate 118 defines at least semi-circumferential gear face 120. Wave washer 121 is provided between drag cam plate 118 and spool 48. Additionally, a plurality of washers 122 are provided between wave washer 121 and spool 48.

Drag cam pinion 123 extends through drag cam pinion orifice 29 defined by frame 18. Drag cam pinion 123 defines a wheel mount portion that extends rearwardly of frame 18. Drag cam pinion 123 additionally defines a pinion gear for engaging gear face 120 of drag cam plate 118.

Drag adjusting wheel 128 is mounted on a wheel mount portion of drag cam pinion 123. Drag adjusting wheel 128 is accessible from an exterior of body 12 for selectively rotating drag cam pinion 123 and drag cam plate 118. Drag adjusting wheel 128 has a forward face 130 defining irregular surface 132 (FIGS. 3, 5), preferably comprised of a plurality of detents.

Figure 5:
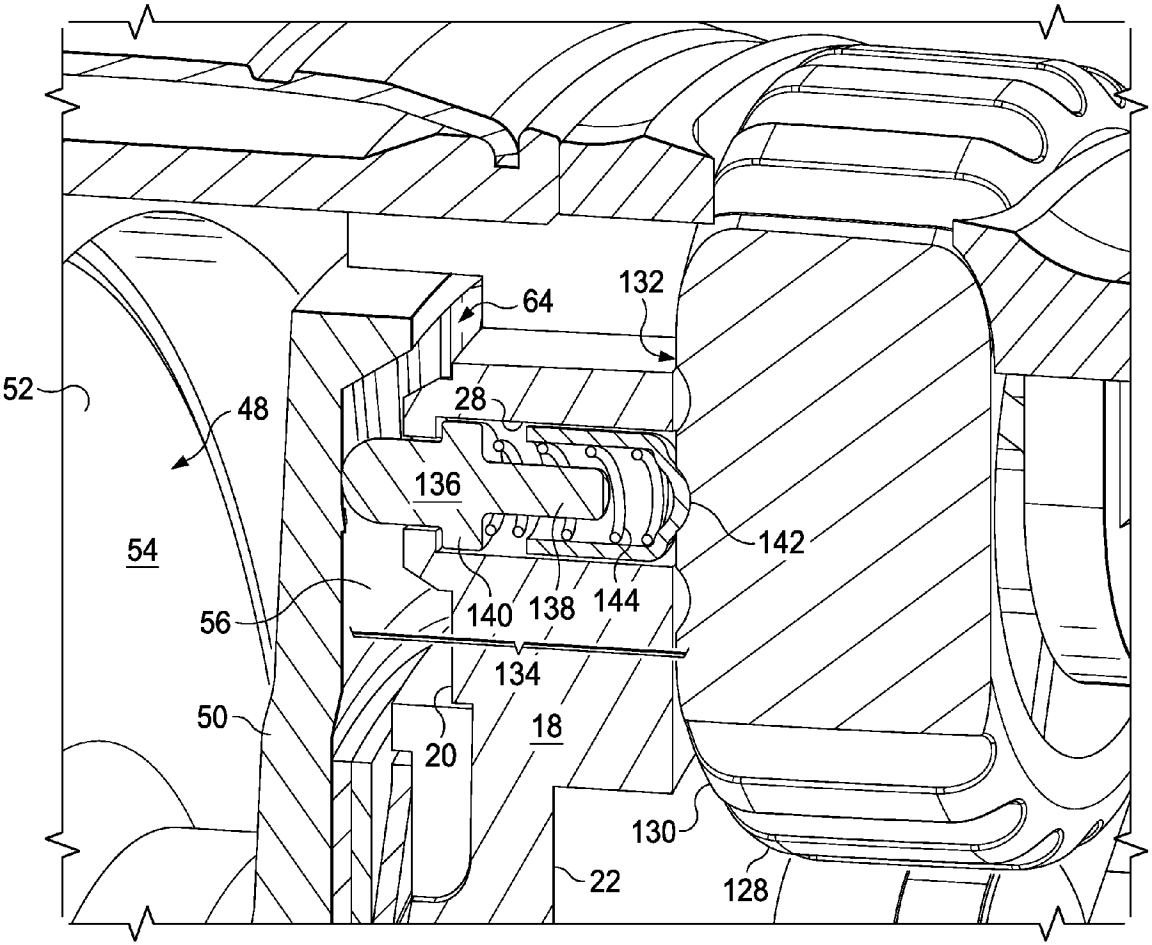
FIG. 5 is an enlarged view of the dual clicker assembly of the reel of FIG. 1.

As best shown in FIG. 5, dual clicker assembly 134 is made up of dual clicker member 136. Dual clicker member 136 includes pin portion 138 that defines flange 140. Pin member 138 passes through clicker orifice 28 of frame 18. Dual clicker assembly 134 has a cap 142 that defines a rearward end for engaging irregular surface 132 of drag adjusting wheel 128 for providing tactile and audible feedback when drag adjusting wheel 128 is rotated. Pin member 138 has a forward end for engaging irregular surface 64 of rearward face 56 of spool 48 for providing tactile and audible feedback once spool 48 is rotated. A forward side of flange 140 engages frame 18 and functions as a stop for pin member 138.

Clicker spring 144 has a forward end in communication with a rearward side of flange 140 of pin member 138. Clicker spring 144 has a rearward end in communication with an inside of cap 142. Clicker spring 144 pushes pin member 138 and cap 142 apart for engaging pin member 138 with irregular surface 64 of spool 48 and for engaging cap 142 with irregular surface 132 of drag adjusting wheel 128.

Front cover assembly 150 is secured to frame 18 and encloses spinner head assembly 68, spool 48, and washers 115, 116, 121, and 122.

Crank gear assembly 152 is mounted to rear side 22 of frame 18. Crank gear assembly 152 has a crankshaft 154 mounted transversely to main shaft 38. Crankshaft 154 supports plate member 156 defining face gear 158 on a first side for engaging main shaft pinion gear 46 on main shaft 38. Crank gear assembly 152 defines a clicker gear (not shown) on a second side of plate member 156.

A/R switch 162 is secured to rear side 22 of frame 18. A/R switch 162 has an actuator 164 accessible by a user and resilient prong 166 for selective engagement with clicker gear of plate member 156 of crank gear assembly 152 for providing an audible click sound. A/R switch 162 additionally defines an A/R tab 168.

AIR pawl 170 is pivotally secured within body 12. A/R pawl 170 has an engagement end 172 capable of being selective rotated into engagement with a clicker gear on crank gear assembly 152 to prevent reverse rotation of crank gear assembly 152. A/R actuator 174 is rotatably mounted on crank gear shaft 154 adjacent to the second side of plate member 156. When A/R switch 162 is in a "bait alert off" position, A/R actuator 174 is disengaged from A/R pawl 170 upon reverse rotation of crank gear assembly 152 so that engagement end 172 of A/R pawl 170 may engage clicker gear to prevent rotation of crank gear assembly 152. Additionally, when A/R switch 162 is an a "bait alert on" position, A/R tab 168 of A/R switch 162 prevents A/R actuator 174 from engaging A/R pawl 170, thereby permitting crank gear assembly 152 to rotate in either direction.

Thumb button assembly 176 is pivotally secured to thumb button attachment structure 23 of frame 18. Thumb button assembly 176 is provided for selectively forcing main shaft 38 forwardly through frame 18 for releasing tension on drag washers 115 and wave washer 121, thereby permitting low friction rotation of spool 48 and for forcing spinner head assembly 68 forward so that first stem engaging member 110 and second stem engaging member 112 are pushed off a forward end of stem 24, which allows first pin spring 106 to force first pin arm 86 into a retracted position and for allowing second pin spring 108 to force second pin arm 96 into a retracted position.

Back cover 178 is affixed to rear edge 116 of body 12. A first side handle bushing 180 is received in first side orifice 30. A second side handle bushing 182 is received in second side orifice 32. Bearing retainer 184 is provided for securing second side bushing 182 within body 12.

Handle screw 186 is inserted into body 12 through first side handle bushing 180 and through second side handle bushing 182. Handle screw 186 defines a head end and a threaded end. A handle nut lock washer is provided on handle screw 186 between head end and body 12. Handle assembly 194 is threadably received on threaded end of handle screw 186.

Thus, the present invention is well adapted to carry out the objectives and attain the ends and advantages mentioned above as well as those inherent therein. While presently preferred embodiments have been described for purposes of this disclosure, numerous changes and modifications will be apparent to those of ordinary skill in the art. Such changes and modifications are encompassed within the spirit of this invention as defined by the claims.

What is claimed is:

1. A fishing reel comprising:

a body including a frame having front side and a rear side, said frame defining an axial orifice that communicates said front side and said rear side of said frame, said frame defining a clicker orifice that passes from said front side to said rear side of said frame;

a main shaft slidably received in said axial orifice of said body;

a spool rotatably mounted on said frame, said spool having a rearward flange, a forward flange and a line receiving area between said rearward flange and said forward flange;

a drag adjusting wheel mounted in said body, said drag adjusting wheel accessible from an exterior of said body for selective rotation;

a dual clicker passing through said clicker orifice in said frame, said dual clicker engaging said spool and said drag adjusting wheel for providing tactile and audible feedback regarding movement of either of said spool and said drag adjusting wheel; and wherein:

said dual clicker comprises a member and a cap mounted on said member;

said dual clicker comprises a spring for biasing said member and said cap apart;

one of said member and said cap defines a rearward end of said dual clicker for engaging a forward face of said drag adjusting wheel;

one of said member and said cap defines a forward end of said dual clicker for engaging a rearward face of said spool.

2. The fishing reel according to claim 1 wherein:

said forward face of said drag adjusting wheel defines an irregular surface;

said rearward face of said spool defines an irregular surface; and said rearward end of said dual clicker engages said irregular surface of said forward end of said dual clicker engages said irregular surface of said spool.

3. The fishing reel according to claim 2 wherein:

said irregular surface of said forward face of said drag adjusting wheel comprises a plurality of detents.

4. The fishing reel according to claim 2 wherein:

said irregular surface of said rearward face of said spool comprises a plurality of detents.

5. A fishing reel comprising:

a body including a frame having front side and a rear side, said frame defining an axial orifice that communicates said front side and said rear side of said frame;

a main shaft slidably received in said axial orifice;

a spool rotatably mounted on said frame;

a spinner head assembly secured to said main shaft forward of said frame and said spool, said spinner head assembly having a plate having a forward face and a rearward face;

a first pin arm pivotally secured to said rearward face of said plate, said first pin arm presenting a substantially smooth rear surface for minimizing line snags;

said spool defines a forward flange, a rearward flange and a line receiving area between said forward flange and said rearward flange;

said forward flange of said spool defining a circumferential groove; and a ring is received in said circumferential groove of said forward flange of said spool, said ring is free floating in said circumferential groove.

6. The fishing reel according to claim 5 wherein:

said ring has a T-shaped cross section.

7. The fishing reel according to claim 5 wherein:

[said forward flange of said spool defining a circumferential groove;

said ring is received in said circumferential groove of said forward flange of said spool,] said ring [having] *has* a smooth exterior.

8. The fishing reel according to claim 7 wherein:

said ring has a T-shaped cross section.

9. A fishing reel comprising:

a body including a frame having front side and a rear side, said frame defining an axial orifice that communicates said front side and said rear side of said frame;

a main shaft slidably received in said axial orifice;

a spool rotatably mounted on said frame;

a spinner head assembly secured to said main shaft forward of said frame and said spool, said spinner head assembly having a plate having a forward face and a rearward face;

a first pin arm pivotally secured to said rearward face of said plate, said first pin arm presenting a substantially smooth rear surface for minimizing line snags;

said first pin arm has a pin for selectively extending through a pin opening in a circumferential wall of said spinner head assembly;

a first pin spring mounted on said forward face of said plate of said spinner head assembly for biasing said first pin arm to a retracted position.

10. The fishing reel according to claim 9 wherein:

said first pin arm defines a post that extends through a spring post opening in said plate of said spinner head assembly for engaging said first pin spring.

11. The fishing reel according to claim 10 further comprising:

an enclosure member affixed to said forward face of said plate of said spinner head assembly, said enclosure member for permitting said first pin spring to have freedom of movement, but for enclosing said first pin spring and said post to prevent interaction with fishing line.

*12. A fishing reel comprising:*

*a body including a frame having front side and a rear side, said frame defining an axial orifice that communicates said front side and said rear side of said frame;*

*a main shaft slidably received in said axial orifice; a spool rotatably mounted on said frame;*

*a spinner head assembly secured to said main shaft forward of said frame and said spool, said spinner head assembly having a plate having a forward face and a rearward face;*

*a first pin arm pivotally secured to said rearward face of said plate, said first pin arm presenting a substantially smooth rear surface for minimizing line snags; and wherein*

*said spool defines a forward flange;*

*said forward flange of said spool defining a circumferential groove;*

*a ring is received in said circumferential groove of said forward flange of said spool, said ring having a smooth exterior.*

*13. The fishing reel according to claim 12 wherein:*

*said ring has a T-shaped cross section.*

*14. A fishing reel comprising:*

*a body including a frame having front side and a rear side, said frame defining an axial orifice that communicates said front side and said rear side of said frame;*

*a main shaft slidably received in said axial orifice; a spool rotatably mounted on said frame;*

*a spinner head assembly secured to said main shaft forward of said frame and said spool;*

*said spool defines a forward flange, a rearward flange and a line receiving area between said forward flange and said rearward flange;*

*said forward flange of said spool defining a circumferential groove; and*

*a ring is received in said circumferential groove of said forward flange of said spool, said ring is free floating in said circumferential groove.*

*15. The fishing reel according to claim 14 wherein:*

*said ring has a T-shaped cross section.*

*16. The fishing reel according to claim 14 wherein:*

*said ring has a smooth exterior.*

*17. A fishing reel comprising:*

*a body including a frame having front side and a rear side, said frame defining an axial orifice that communicates said front side and said rear side of said frame;*

*a main shaft slidably received in said axial orifice; a spool rotatably mounted on said frame;*

*a spinner head assembly secured to said main shaft forward of said frame and said spool;*

*said spool defines a forward flange, a rearward flange and a line receiving area between said forward flange and said rearward flange;*

*said forward flange of said spool defining a circumferential groove; and*

*a ring is received in said circumferential groove of said forward flange of said spool, said ring has a smooth exterior.*

*18. The fishing reel according to claim 17 wherein:*

*said ring has a T-shaped cross section.*

*19. The fishing reel according to claim 17 wherein:*

*said ring is free floating in said circumferential groove.*

* * * * *